United States Patent [19]

Flynn

[11] 4,333,796
[45] Jun. 8, 1982

[54] METHOD OF GENERATING ENERGY BY ACOUSTICALLY INDUCED CAVITATION FUSION AND REACTOR THEREFOR

[76] Inventor: Hugh G. Flynn, 55 Council Rock Ave., Rochester, N.Y. 14610

[21] Appl. No.: 907,737

[22] Filed: May 19, 1978

[51] Int. Cl.³ .............................................. G21B 1/00
[52] U.S. Cl. .................................... 376/100; 376/149
[58] Field of Search .................... 176/1, 2, 3; 181/115, 181/120

[56] References Cited

U.S. PATENT DOCUMENTS

| | | | |
|---|---|---|---|
| 3,047,480 | 7/1962 | Lovberg et al. | 176/1 |
| 3,084,629 | 4/1963 | Yevick | 176/1 |
| 3,346,458 | 10/1967 | Schmidt | 176/1 |
| 3,624,239 | 10/1971 | Fraass | 176/1 |
| 3,756,344 | 9/1973 | Daiber et al. | 176/1 |
| 3,925,990 | 12/1975 | Gross | 176/3 |
| 4,043,755 | 8/1977 | Bartko et al. | 176/19 R |

OTHER PUBLICATIONS

New Scientist (5/24/79), pp. 626–630, Kenward.
Phys. Rev. Lett., vol. 37, No. 14 (10/4/76), pp. 897–898, Jacobson et al.
Physics of Fluids, vol. 16, No. 12 (12/73) Means et al., pp. 2304–2318.
J. Plasma Physics (1975), vol. 14, pt. 3, pp. 373–387, Frommelt et al.

Primary Examiner—S. A. Cangialosi
Attorney, Agent, or Firm—Shlesinger, Fitzsimmons & Shlesinger

[57] ABSTRACT

Two different cavitation fusion reactors (CFR's) are disclosed. Each comprises a chamber containing a liquid (host) metal such as lithium or an alloy thereof. Acoustical horns in the chamber walls operate to vary the ambient pressure in the liquid metal, creating therein small bubbles which are caused to grow to maximum sizes and then collapse violently in two steps. In the first stage the bubble contents remain at the temperature of the host liquid, but in the second stage the increasing speed of collapse causes an adiabatic compression of the bubble contents, and of the thin shell of liquid surrounding the bubble. Application of a positive pressure on the bubble accelerates this adiabatic stage, and causes the bubble to contract to smaller radius, thus increasing maximum temperatures and pressures reached within the bubble. At or near its minimum radius the bubble generates a very intense shock wave, creating high pressures and temperatures in the host liquid. These extremely high pressures and temperatures occur both within the bubbles and in the host liquid, and cause hydrogen isotopes in the bubbles and liquid to undergo thermonuclear reactions. In one type of CFR the thermonuclear reaction is generated by cavitation within the liquid metal itself, and in the other type the reaction takes place primarily within the bubbles. The fusion reactions generate energy that is absorbed as heat by the liquid metal, and this heat is removed from the liquid by conduction through the acoustical horns to an external heat exchanger, without any pumping of the liquid metal.

21 Claims, 3 Drawing Figures

METHOD OF GENERATING ENERGY BY ACOUSTICALLY INDUCED CAVITATION FUSION AND REACTOR THEREFOR

This invention relates to a method of producing thermonuclear energy by cavitation of a liquid metal, and more particularly to a reactor in which such energy may be generated.

BACKGROUND OF INVENTION

When certain liquids are subjected to reduction in pressure of an appropriate duration and magnitude, small pre-existing bubbles of gas and vapor in the liquids expand to some maximum size and then collapse with great violence. This phenomenon is called cavitation and, when properly controlled, causes very high energy densities to occur both within the bubbles and in the surrounding liquid. The invention disclosed hereinafter relates to a device called a cavitation fusion reactor (CFR), which uses cavitation of a liquid metal to bring about thermonuclear fusion of hydrogen isotopes and other liquid (low Z) elements, both within a bubble created in the host liquid (metal), and in the surrounding host liquid. In its normal operation a reactor of this type produces one or more of the following: the release of energy which is removed as heat; the creation of elements, such as tritium or helium-3, that can be used as thermonuclear fuel, either in the CFR itself in a regenerative manner or in some other fusion device; the fission of heavy elements distributed in the liquid metal; and the radiation of neutrons.

In what follows, as asterisk (*) used on a symbol for a physical quantity denotes a quantity that is in some system of units. Thus, $R_n^*$ denotes the equivalent or equilibrium radius of a bubble in centimeters. The symbol $R^*$ is the time-varying radius of the bubble in centimeters. The symbol, R, is the non-dimensional radius of a bubble and is defined by $R = R^*/R_n^*$. The absence of an asterisk denotes a non-dimensional quantity. The words "negative pressure" will mean a reduction of the ambient pressure in the liquid metal by an applied pressure, which may or may not make the total pressure less than zero. The small bubbles from which cavitation starts will be called "seeds", the liquid in which the cavitation takes place will be called the "host liquid", and a method of obtaining a specified distribution of seeds will be called "seeding" the host liquid. A very small seed containing N moles of gas may be lodged on a minute particle and not have a spherical shape. The term, "equivalent radius", $R_n^*$, will be used to denote the radius of a spherical bubble containing the same number of moles of gas at the same ambient temperature and pressure in the host liquid. For a spherical bubble at rest in a liquid, the terms "equivalent radius" and "equilibrium radius" are identical. The cycle of expansion and contraction that a bubble undergoes under the influence of an applied pressure field will be called a "cavitation event", and the region in the host liquid where these events occur will be called the "cavitation zone". Seeds may be a random distribution of very small bubbles with some average equivalent radius (say, of the order of $10^{-5}$ or $10^{-4}$ cm.) or may be distribution of larger bubbles whose equivalent radii fall in a specified range. The words "bubble" and "cavity" used herein are synonyms.

Two main types of cavitation fusion reactors are described hereinafter: the Type I CFR, which maximizes the production of energy and other useful products through thermonuclear fusion in the host liquid; and the Type II CFR, which maximizes the production of tritium and other useful products through thermonuclear fusion within the bubbles in the host liquid.

Both types of cavitation fusion reactors may be operated in a mode which produces little or no radioactive products. In this mode the reaction is between lithium nuclei and ordinary hydrogen ($_1H^1$ or h) nuclei. In alternative modes of operation the devices use deuterium ($_1H^2$ or d), tritium ($_1H^3$ or t), or a mixture of both d and t as the H-isotope fuel, and the liquid metal may be lithium, beryllium, aluminum, tin, indium, thallium or some other element or alloy. Deuterium is the heavy hydrogen isotope (H-isotope) that occurs in nature, while tritium, the other heavy H-isotope, does not. Only deuterium need be supplied from an external source in both the start-up phase and steady-state operation of the Type I CFR or a Type II CFR. Type I CFR uses a mixture of deuterium and tritium in order to yield a net gain of energy that can be transformed into useful work. The required inventory of tritium is produced within the reactor by the fusion of deuterium nuclei and the interaction of neutrons with lithium or lithium alloyed with beryllium. In a similar manner, a Type II CFR may operate as a generator of tritium that requires only deuterium as the externally supplied fuel.

Once a CFR of either type is placed in operation, the reactor will "breed" its own tritium; that is, the reactor will produce more tritium than it burns, no matter whether or not the fusion reactions start with deuterium alone or with a mixture of deuterium and tritium.

THE HOST LIQUID

In the collapse of a cavitation bubble, the controlling parameter is the compressibility of the host liquid. Viscosity plays a minor role and in the final stage of collapse the interface moves so rapidly that the effect of heat conduction is minimal and the entropy of the gas and vapor within the bubble becomes constant. The term "compressibility" is here used with a specific meaning: a compressible liquid is one with a finite speed of sound. The greater the speed of sound in a liquid, the less is its compressibility in this sense used here. If the speed of sound of a liquid were infinite, the liquid would be incompressible.

All real liquids have finite speeds of sound which increase with an increase of pressure in the liquid. When the speed of sound in a liquid is low, compressibility is most effective in moderating the violence of collapse of a bubble and in lowering the maximum temperatures and pressures that can be attained. When a bubble collapses, the pressure in the liquid at and near the interface increases, and hence the local speed of sound increases there also. Because of this increase in the speed of sound at the interface, the violence of collapse may also be increased.

For this invention the host liquid must be one with a speed of sound as large as possible, and thus the host liquid must be a liquid metal. While all liquid metals have large speeds of sound, lithium and beryllium have the largest speeds of sound over a wide range of pressures.

One important characteristics of a liquid metal is its vapor pressure. Listed below are the vapor pressures of several liquid metals at their melting points:

| Metal | MP (K) | Vapor Pressure (bars) | ΔK |
|---|---|---|---|
| Li | 452 | $1.63 \times 10^{-13}$ | 566 |
| Be | 1552 | $4.18 \times 10^{-5}$ | 207 |
| Al | 933 | $2.42 \times 10^{-11}$ | 877 |
| In | 430 | $1.42 \times 10^{-22}$ | 1092 |
| Sn | 505 | $5.78 \times 10^{-26}$ | 1260 |

The melting points (MP) are listed in degrees Kelvin and the range of temperatures above the melting point in which the vapor pressure remains less than 1 mm Hg ($1.33 \times 10^{-3}$ bars) is listed under the heading ΔK. The quantity ΔK., is an important measure of the suitability of a metal as a host liquid. Of the metals listed beryllium has the smallest value of ΔK. and a relatively high vapor pressure at its melting point.

Cavitation bubbles spend most of their lifetimes in an expanded state in which the vapor pressure of the liquid may be much greater than the pressure of the gas in it. Consequently a high vapor pressure at the start of collapse could have a disproportionate effect on the maximum temperatures and pressures attained at the end of collapse. Similarly, during collapse, a high vapor pressure could mean that a large fraction of the mechanical energy used in compressing the bubble would be expended in heating and ionizing the vapor atoms rather than the hydrogen isotopes. On the other hand, the presence of a small amount of vapor could have the effect of decreasing the thermal conductivity of the gas-vapor mixture and thus hastening the onset of the adiabatic phase of compression. Both lithium and aluminum are examples of liquid metals with moderate vapor pressures over a wide range of temperatures above their melting points. Indium and tin are examples of liquid metals that have very low vapor pressures over an even wider range of temperatures above their melting points. Beryllium is an example of a liquid metal with a relatively large vapor pressure and a small value of ΔK. A large value of ΔK. permits the selection of an ambient or operating temperature, $\theta^*$, in a reactor over a large range without causing an unfavorable rise in vapor pressure in collapsing bubbles.

Lithium and beryllium are unique among host metals in that their use in a CFR gives rise to material products that either may be used as fuel in subsequent cavitation events or are inert gases effective in slowing down neutrons.

Both of the natural isotopes of lithium interact with neutrons to produce helium-4 and tritium. Lithium-6 has a large collision cross section for the capture of thermal neutrons and the reaction produces energy that is absorbed as heat. The more abundant isotope, lithium-7, which has a much smaller cross section for thermal neutrons, reacts with an energetic neutron to produce another neutron as well as helium-4 and tritium.

The natural isotope of beryllium ($_4Be^9$) interacts with energetic neutrons to produce helium and tritium. In one reaction chain, beryllium produces two neutrons and two helium-4 nucleii for every beryllium nucleus interacting with a neutron. In a second chain, the reaction produces helium-4 and tritium and a net gain in energy as well, via an intermediate stage in which lithium-6 is produced.

In interactions with neutrons released by fusion reactions, both lithium and beryllium thus produce helium-4 and tritium as end products. The helium-4 is an inert gas that helps moderate energetic neutrons and the tritium can be used directly as fuel in the CFR or removed for use in other fusion reactors. Hence a host liquid of lithium or beryllium would provide a regenerative system that re-seeds itself with tritium.

The relatively high vapor pressure of beryllium above its melting point and its small value of ΔK. mitigate against its use as a host liquid alone, but alloys of lithium and beryllium have several advantages that neither lithium or beryllium alone possesses. Such alloys containing hydrogen isotopes would be very effective in slowing down and capturing energetic neutrons released in fusion reactions. In such reactions, helium-4 and tritium and energy would be produced.

The phase diagram for Li-Be alloys does not seem to have been determined. However, the chemical similarity between beryllium and aluminum makes it probable that Li-Be alloys behave much as Li-Al alloys. Based on the phase diagram for Li-Al, it is anticipated that the addition of beryllium to liquid lithium would gradually increase the melting point and the sound speed of the alloy. The great advantage of such an alloy would be this increase in the speed of sound as compared to that of lithium alone. At the same time, the vapor pressure of beryllium at such temperatures would be very low compared to that of lithium alone. Solid beryllium has a sound speed of $1.24 \times 10^4$ meters sec$^{-1}$ while liquid lithium has a sound speed of $4.2 \times 10^3$ meters sec$^{-1}$ at 1000 K. Thus the sound speed of a liquid Li-Be alloy at that temperature should be much higher than that of Li alone.

The liquid metals used in a CFR, therefore, can be regarded as falling into three categories:

a. Alpha-metals in which H-isotopes dissolve readily and with which H-isotopes form stable compounds over at least part of the ambient or operating temperature of interest. The most important metal of this type is lithium, either in the natural isotopic mixture of lithium-6 ($_3Li^6$) and lithium-7 ($_3Li^7$) or as one of those isotopes alone, or as lithium-7 enriched with lithium-6.

b. Beta-metals in which H-isotopes dissolve readily but with which they do not form stable compounds over the operating temperature of interest. The most important metals of this type are beryllium and aluminum.

c. Gamma metals in which H-isotopes neither dissolve readily nor with which they form stable compounds in the operating temperature of interest. Tin, thallium and indium are examples of such metals.

In a Type I CFR the host metal is usually normal lithium, lithium-6, lithium-7, beryllium or an alloy of these light metals. In a Type II CFR, the host metal is, usually, tin, thallium, indium or aluminum.

DISTRIBUTION OF HYDROGEN ISOTOPES

The hydrogen isotopes are distributed in the host liquid either as dissolved gas, as hydrides, or as small bubbles or "seeds". Seeds containing H-isotopes and vapor of the host metal may be a random distribution of bubbles of very small size (with an average equivalent radius of the order of $10^{-5}$ to $10^{-4}$ cm.) or a carefully generated set of bubbles of much larger size. Helium may also be included as the third constituent of the content of a seed.

In an alpha metal such as lithium, at a given ambient temperature, $\theta^*$, the mole fraction, $Y_H$, of H-isotopes dispersed in the liquid (either dissolved or as hydrides or stabilized as a gas) is a function of the "dissociation pressure" $p_H^*$. Thus control of $p_H^*$ above a surface of the liquid controls the amount of gas, $Y_H$, dispersed in the liquid. It is assumed that the ambient temperature is higher than the melting point of any hydrides that may form. Because H-isotopes both dissolve in and combine chemically with alpha-metals, the gas in a bubble tends to be at its equilibrium pressure, $p_H^*$, which usually is much less than the ambient pressure in the liquid. As a result the only bubbles in an alpha liquid that persist in time are very small ones that stabilize on minute inhomogeneities such as fragments of hydrides. In such a host liquid, the amount of gas in a growing or contracting bubble at any time has little relation to the amount of gas that was in the original seed from which it grew.

When an alpha-metal such as lithium is used as the host liquid, there is one simple procedure by which seeding of the liquid may be accomplished. An atmosphere of H-isotopes is maintained over a surface of the host liquid at the dissociation pressure, $p_H^*$, corresponding to the mole fraction, $Y_H$, specified for the CFR at the specified ambient temperature, $\theta^*$. The H-isotopes are absorbed, either in dissolved form or as hydrides. Small seeds of H-isotopes will nucleate on existing inhomogeneities in the liquid. As a result, there will be a stable distribution of very small seeds with some equilibrium size (of the order of $10^{-5}$ cm. to $10^{-4}$ cm. in equivalent radius). A more rapid dispersion would be effected by allowing the liquid metal to be mixed mechanically with the H-isotopes under the same conditions.

The net gain of energy produced by a CFR is maximized when the fuel used is a mixture of deuterium and tritium distributed through a host liquid of lithium or of a Li-Be alloy. In one mode of operation, deuterium is introduced into the host liquid at a surface and diffuses into the cavitation zone. The required inventory of tritium is then produced in the cavitation zone by fusion of deuterium nuclei alone. A specified mole fraction, $Y_d$, of deuterium is maintained in the host liquid by the appropriate dissociation pressure, $p_d^*$, over a surface and the specified mole fraction, $Y_t$, of tritium maintained by the fusion and neutron reactions that produce tritium. Thus only deuterium, the naturally occuring isotope of hydrogen, need be supplied to the CFR from an external source for fuel, both during the start-up phase and the steady-state operation of the CFR.

In another mode of operation, tritium required in the start-up phase is introduced into the host liquid containing lithium-6, lithium-7, beryllium or helium-3 by irradiating the host liquid with neutrons from an external source. Deuterium is introduced into the host liquid at a surface (as above) and diffuses into the cavitation zone where tritium is being generated by neutrons. A specified mole fraction, $Y_d$, of deuterium is maintained in the host liquid by the appropriate pressure, $p_d^*$, over a surface and the initial inventory of tritium maintained by fusion and neutrons reactions that produces tritium.

As will be noted later, the mole fraction of H-isotopes maintained in a CFR's host liquid has a critical effect on operation of a CFR using an alpha-metal such as lithium.

In gamma metals, it is possible to use much larger seeds of H-isotopes which can be introduced in a variety of fashions. While in alpha-metal such as lithium, the average seed will be a bubble having an equivalent radius of $10^{-5}$ cm. to $10^{-4}$ cm., seeds of the order of $10^{-3}$ cm. to $10^{-2}$ cm. will be used in a gamma-metal liquid. The expected maximum radius, $R_o^*$, of a bubble will be 500 to 10,000 times larger than the initial radius, $R_n^*$, of a seed. Hence the order of magnitude of $R_o^*$ will change with the expansion ratio, $R_0^*/R_n^*$, as follows:

| Expansion ratio = | 500 | 1000 | 10,000 |
|---|---|---|---|
| $R_n^*$ (cm) | $R_o^*$ (cm) | $R_o^*$ (cm) | $R_o^*$ (cm) |
| $10^{-5}$ | $5 \times 10^{-3}$ | $10^{-2}$ | $10^{-1}$ |
| $10^{-4}$ | $5 \times 10^{-2}$ | $10^{-1}$ | 1 |
| $10^{-3}$ | $5 \times 10^{-1}$ | 1 | 10 |
| $10^{-2}$ | $5 \times 10^0$ | 10 | $10^2$ |

The use of large bubbles as seeds is advantageous in a Type II CFR because the amount of H-isotopes contained in a seed increases as $R_n^{*3}$ so that a seed with $R_n^* = 10^{-2}$ cm. has $10^9$ more H-nucleii than a seed of $10^{-5}$ cm. In a gamma liquid, the H-isotopes neither dissolve or react readily with the host liquid so that the amount of gas in a seed is essentially that in the bubble at the start of the collapse phase. However, the use of large bubbles as seeds require that the cavitation zone be in a zero-gravity field.

When a distribution of such large seeds are introduced in a gamma-metal liquid in a zero gravity field, the distribution will be relatively stable in space and time. In the absence of gravity, bubbles will not rise to the surface nor disappear rapidly through diffusion.

When beta-metals are used as host liquids, the behavior of gas bubbles is much the same as in alpha metals except for the absence of hydrides in the host liquid. Alloys of Li-Be will fall in the alpha-metal category.

In addition to the methods described above for seeding CFR using alpha-metals as the host liquid, the following methods for seeding a host liquid may be employed:

1. Small seeds of H-isotopes in a beta-metal may be caused to grow into seeds of a specified size through the process of rectified diffusion brought about through an auxiliary acoustic field that may be independent of the hereinafter described primary field that causes bubbles to grow to many times their initial size.

2. A metal that resists attack by the host liquid may be caused to absorb H-isotopes in appreciable quantities and then inserted into the wall of the reaction chamber or into the liquid at a surface other than a wall. The inner face of this insert will then be caused to release seeds into the host liquid by a variety of methods (e.g., by a change of pressure at the external surface of the insert). The H-isotopes injected into the host liquid would then be replenished in the solid insert by additional gas absorbed at its outer surface.

3. A metal that resists attack by the host liquid may be caused to absorb H-isotopes in appreciable quantities and then inserted into the host liquid as an electrode. A positive voltage applied to the electrode would then evolve seeds of H-isotopes of controllable size. The size of the seeds would be a function of the voltage that is applied.

4. Small particles of controlled size made up of compounds of a metal and H-isotopes are distributed through the host liquid and then caused to dissociate into the metal and seeds of H-isotopes by changing the ambient temperature of the host liquid. The size distribution of the seeds would be determined by the size distribution of the particles in a gamma-metal but not in an alpha metal.

5. Small particles of controlled size containing H-isotopes as dissolved or absorbed gases are distributed in the host liquid and then caused to evolve known amounts of these gases when the particles dissolve or the ambient pressure and pressure are changed.

6. Simple mechanical agitation of the host liquid (by a stream of H-isotopes through the liquid, for example) in the presence of H-isotopes would produce a random distribution of seeds whose average size in general would be small except in a gamma-metal in a zero-gravity field. In general, large bubbles would tend to dissolve away or rise out of the host liquid while bubbles of the order of $10^{-4}$ cm. radius or less would move about in a random fashion because of brownian motion if stabilized against diffusion.

OPERATING TEMPERATURE

The specification of an operating temperature, $\theta_n^*$, depends on the type of cavitation fusion reactor. Viewed as part of a thermodynamic system, the host liquid is simply a reservoir from which heat is transferred to a second, external reservoir. The fraction of energy in the second reservoir available for conversion to useful work increases when its temperature increases. Because the fusion-generated heat is transferred to the external reservoir by conduction, this thermodynamic condition requires that the host liquid be operated at as high a temperature as possible consistent with other constraints.

There are several constraints that effectively place an upper limit on the ambient (or operating) temperature. One is the corrosion of the reaction chamber by the liquid metal used as the host liquid. The attack by a liquid metal on such surfaces is accelerated by an increase in temperature and the host metal will become increasingly contaminated by material from the reactor surfaces. Another constraint is the vapor pressure, $p_v^*$, of the host liquid, which is a rapidly increasing function of the temperature. The vapor pressure in a bubble may have a disproportionate effect on the dynamics of bubbles; a high vapor pressure may moderate the collapse of a bubble and a large mole fraction of vapor atoms in the bubble may impede the operation of both Type I and Type II reactors.

In any CFR, both the host liquid and the contents of a bubble will remain at the ambient temperature, $\theta_n^*$, during all of the expansion phase and most of the contraction phase. In the final stage of collapse, the bubble and a thin shell of liquid around it are compressed adiabatically and the terminal, constant values of the entropy in the bubble and in the liquid shell are to a large extent determined by the ambient temperature.

In a Type I CFR, a major design objective is to achieve as high a maximum pressure as possible in the liquid at the bubble interface on collapse. This objective requires that the terminal, constant value of the entropy, $S_c^*$, of the gas and vapor in the bubble be minimized and hence a low ambient, or operating, temperature be chosen. In a Type I CFR, the objective of a high maximum pressure on collapse also necessitates that the amount of H-isotopes and vapor in the bubble be minimized when the radius approaches its minimum value, $R_m^*$. For given mole fractions, $Y_d$ and $Y_t$, of deuterium and tritium in the host liquid, the equilibrium "dissociation pressure", $p_H^*$, of the H-isotopes is a function of the ambient temperature when the host metal is an alpha-metal. A choice of a low ambient temperature minimizes both $p_H^*$ and $p_v^*$ and hence the amount of H-isotopes and vapor in the bubble on collapse.

In a Type I CFR, generation of thermonuclear fusion in a thin shell surrounding the collapsed bubble is not a critical function of the terminal, constant value of the entropy, $S_L^*$, in the liquid shell. Hence placing some upper limit on the operating temperature does not in itself mitigate against the generation of very high temperatures in the liquid on collapse of a bubble. In a Type I reactor, the temperature in the liquid shell is multiplied by the very intense shock wave radiated by the bubble interface near its minimum radius and the condition for fusion is reached by a sequence of adiabatic compression of the liquid followed by a second compression by the shock wave.

However, there is a lower limit on the ambient (or operating) temperature when the host liquid is an alpha-metal. Then a lower limit on the temperature is established by the requirement that it be greater than the melting point of any solid hydride that can form. In lithium where LiH melts at 975 K. (or even less depending on the fraction of H-isotopes present) the host metal would have a vapor pressure of approximately 15 mm Hg at 1200 K. At an operating temperature of 1000 K. to 1200 K., the vapor pressure would still be low and there still would be present in the liquid minute fragments of the hydrides which would serve as nucleation sites for seeds of H-isotopes.

Furthermore, in a Type I CFR using lithium, the range of 1000 K. to 1200 K. is high enough to cause a terminal value of $S_c^*$ at which fusion of deuterium alone can occur in the start-up phase.

In general, a high vapor pressure within a bubble is undesirable for the reasons stated above. Lithium is an exception to this general design criterion. At low concentrations, lithium atoms in a mixture of H-isotopes will markedly reduce the thermal conductivity of the gas-vapor mixture and hence assist in bringing about adiabatic compression of the bubble's contents at an earlier stage of motion. Lithium nuclei in a mixture of H-isotopes may serve as a fuel in thermonuclear reactions with those isotopes. While in most liquids, it is desirable to keep the vapor pressure and hence the ambient temperature low, the restriction is not critical for lithium at temperatures at or below 1200 K.

In a Type II CFR, a major design objective is to achieve the highest possible temperature within a collapsed bubble. The final temperature reached in the adiabatic compression of a bubble is an exponential function of the terminal, constant value of the entropy. This statement is exact for an ideal gas and an approximate one for non-ideal gases. This requirement means that the entropy, $S_c^*$, of the contents should be as large as possible during the adiabatic compression of a bubble in a Type II CFR. If the host metal is tin, the vapor pressure is $1.33 \times 10^{-3}$ mm Hg at 1400 K. Hence the operating temperature in a Type II CFR may be as high as 1400 K. or 1500 K. in order to achieve a large value of $S_c^*$ in the final stage of collapse without having an undesirably high vapor pressure.

In a Type II CFR, a large value of $O_n^*$ combined with a low value of $p_v^*$ means that less mechanical energy is used in dissociating and then ionizing the gas and a larger share is then used in heating the ionized gas to high temperatures. The fewer heavy vapor atoms that are present, the more rapidly will the process of ionizing the H-isotopes will be completed.

OPERATING PRESSURE

The static, operating (or ambient) pressure, $p_{ln}^*$, of a CFR is the pressure that exists in the host liquid independently of a time-varying pressure, $p_A^*(t)$. The total pressure in the cavitation zone of the host liquid is the sum of $p_{In}^*$ and $p_A^*(t)$. There are several ways in which this parameter may be used to control the operation of a CFR.

The static pressure affords an alternative way in which to apply a positive pressure of specified magnitude to a bubble that has expanded to a maximum radius, $R_o^*$, and starts to contract. In some modes of operation, it may be preferable to transfer mechanical energy to the collapsing bubble via the static, ambient pressure than by means of an acoustic pressure. For example, when the applied pressure field consists solely of a negative pulse, causing a seed to expand into a much larger bubble, the required positive pressure at the start of collapse may be supplied by the ambient pressure. However, it is important to point out that the speed of collapse depends almost solely on $W_m^*$, the total mechanical work done on the bubble by the total pressure. The ambient pressure, $p_{In}^*$, may be 1 bar or 100 bars, but the speed of collapse for a given compression ratio, $R_o^*/R^*$, is controlled by $W_m^*$ and not by $p_{In}^*$.

One effect of $p_{In}^*$ is to change the amount of H-isotopes contained in a bubble with a specified equivalent radius, $R_n^*$. Thus, for $R_n^* = 10^{-3}$ cm., a bubble would contain 50 times more gas when $p_{In}^* = 100$ bars than when $p_{In}^* = 1$ bar. In a Type II CRF, this multiplication of H-nuclei available in a large seed is an important factor in energy gain and neutron production.

There are several factors that place an upper limit on the ambient pressure in a CFR. Diffusivity and solubility of H-isotopes in metals such as W, Mo, Ti and Zr (that may be used as walls of the reaction chamber) increase rapidly with pressure. Hence the normal specification of $p_{In}^*$ will be that due to hydrostatic pressure plus the dissociation pressure, $p_H^*$, of the H-isotopes present in order to assist in containment of tritium within the reaction chamber.

Large negative and positive pressures $p_A^*(t)$ must be established in the cavitation zone of any CFR. These pressure fields may be generated in a variety of ways and devices. However, as noted above, the most important quantity associated with the interaction of a bubble with such a field is the amount of mechanical energy transferred to the bubble during its expansion from a seed and its subsequent collapse. The detailed specification of the acoustic field and the manner in which it is generated are less important than its ability to transfer a given amount of energy to the bubble.

There is, however, one important time constraint on the cycle of negative and positive pressure created in the CFR. At the start of such a cycle, the pressure falls to some negative minimum and then rises back to zero. This time interval in which the pressure $p_A^*(t)$ is negative must be long enough in duration for the seed to grow to its maximum size before a positive pressure is applied. A typical example is a seed whose initial radius, $R_n^*$, is $2 \times 10^{-5}$ cm. As a result of an applied negative pressure of $-50$ bars, the seed grows into a bubble whose maximum radius, $R_o^*$, is $2.7 \times 10^{-1}$ cm. during a time interval of $1.8 \times 10^{-4}$ sec. Under an applied positive pressure of $+50$ bars, the bubble collapses to a minimum size in $1.7 \times 10^{-4}$ sec. If the acoustic pressure field in this example were time-harmonic (or sinusoidal), the period would need to be at least $3.6 \times 10^{-4}$ sec. and the frequency not greater than $2.8 \times 10^3$ Hz. Otherwise, the expansion ratio of the bubble would be much less and the collapse much less violent. That is, if the frequency were higher, the bubble would not reach the maximum radius of $2.7 \times 10^{-1}$ before it started to contract under the positive pressure.

The volume of the host liquid occupied by the cavitation zone, the number of cavitation events taking place during one pressure cycle and the repetition rate of such events have important roles in determining the power output of a CFR. The economic utility of a CFR increases when:

1. In one pressure cycle, thermonuclear fusion is brought about in many bubbles.
2. The pressure cycle is short enough that the expansion-collapse cycle of bubbles occurs many times in a second.

The cavitation zone must be large enough so that there is no interaction between bubbles as they expand and collapse during a pressure cycle. If the maximum radii of the bubbles were 0.1 cm. on an average, then a sphere with a radius of 2 cm. would be a cavitation zone in which 10 bubbles could grow and collapse without undue interaction when the applied pressure amplitudes are large (say, of the order of 100 bars).

If the repetition rate of the acoustic field is 2000 Hz and the number of bubbles creating thermonuclear fusion is 10 in any cycle, then there would be $2 \times 10^4$ cavitation events in the cavitation zone specified above in each second. If each event yields 10 Joules, the power generated in the reactor is 200 kilowatts. This simple calculation shows the premium placed on the use of small bubbles. The number of bubbles that can be created in a cavitation zone at any given times obviously may be increased with a decrease in the average maximum radius, $R_o^*$, of the bubbles, and a decrease in $R_o^*$ permits an increase in the repetition rate.

This conclusion favors the use of a Type I CFR. The operation of a Type II CFR with large seeds must compensate for this decrease in the possible number of cavitation events per second. This compensation can be done through an increase in the fuel nuclei contained in each bubble. However, when a Type II CFR is operated as a device for producing tritium rather than energy, this condition is not so important.

The cavitation zone in a reactor is determined by the geometry of the acoustic field. A pressure field in which the required pressure amplitudes occur only in a very small volume decreases the power output of a CFR by decreasing the number of cavitation events per pressure cycle.

The applied pressure field may be generated in several ways. Two important classes are:

1. Resonant systems
2. Non-resonant systems.

Resonant systems designed around elements such as resonant cylinders, resonant spheres and Helmholtz resonators are typically simple devices useful in some modes of operation of a Type II CFR in which a high repetition rate is not required. The drawback on their use is that the operation of such resonant systems normally requires the host liquid be homogeneous. Once a bubble has grown from a seed, the condition for resonance has been destroyed until all bubbles have expanded to their maximum radii, collapsed and effectively vanished. When a resonant device is used to produce a required negative pressure (say, $-50$ bars), the required positive pressure to be applied during collapse can be supplied by using a static, ambient pressure, $p_{In}^*$, of appropriate magnitude. The cycle of expansion and collapse would be repeated when the condition for resonance is reestablished.

Non-resonant systems are used to establish pressure fields that are either harmonic in time (sinusoidal) or are pulse like. Thus:
  (a) Time harmonic fields are established by tranducers (external to the chamber) that continuously maintain a required time sequence and positive pressure amplitudes in the cavitation zone.
  (b) Pulse-like fields are alternating pulses of negative and positive pressures generated, for example, by shock excitation of a surface in contact with the host liquid, either directly or via "horns".

Both kinds of non-resonant systems may be focussed by means of acoustic lenses or by reflection from a curved surface at which there is a large change in the specific acoustic impedance. When a negative pulse of appropriate amplitude is generated in the host liquid, the corresponding positive pulse may be generated by reflection of the negative pulse from a surface whose specific acoustic impedance is very low compared with that of the host liquid (i.e., from the free surface of the host liquid). The amplitude of the positive pulse is controlled by specification of the ambient pressure, which increases the total pressure on the collapsing bubble to the required value.

When a bubble has reached a maximum radius very much larger than its initial, equivalent radius, the collapse consists of two phases or stages. In the first phase the contents of the bubble remain at the ambient or operating temperature of the host liquid. In the second phase the increasing speed of collapse brings about a transition to an adiabatic compression of the bubble contents and of a thin shell of liquid surrounding the bubble. The positive pressure applied to a collapsing bubble causes this transition to occur at a larger radius than would occur in its absence, and also causes the bubble to contract to a smaller minimum radius. The smaller the minimum radius the greater are the maximum temperatures and pressures that will be reached in the bubble and in the liquid.

At, or near, the minimum radius, a very intense shock wave is radiated by the bubble. The crucial difference between the design of a Type I CFR and a Type II CFR is the relative importance in each of the adiabatic compression of a bubble's contents and the very high pressures and temperatures created in the host liquid by the intense shock wave. A controlling factor during a cavitation event is the amount of work done on a bubble by the applied pressure field. There are many ways in which the parameters of the applied pressure field (duration, period, amplitude) may be chosen, but they are effectively equivalent if the work done on a bubble is the same.

STABILITY OF THE BUBBLE INTERFACE

The generation of high pressures and temperatures produced by a collapsing bubble in the host liquid depends strongly on whether or not the interface of the bubble remains spherical during most of the collapse. When the bubble is expanding, the interface is stable in shape, but when the acceleration is inward the interface is dynamically unstable against any small perturbation of the spherical interface caused by asymmetrical forces. However, in the very final stage of collapse, the acceleration is again outward and the interface is again stable.

The gravitational field of the earth is an asymmetrical force that tends to create perturbations in a bubble's interface and this external force may cause the spherical interface of bubbles to deform during collapse. A zero-gravity field in which such distortions of the initial spherical shape do not occur is found in an orbiting space vehicle. On the surface of the earth a similar cancellation of the earth's gravitational field is produced in a properly designed static, inhomogeneous magnetic field. Both the contents of the bubble and the host metals are either diamagnetic or paramagnetic and, as a consequence, a magnetic field may be so designed that in the cavitation zone of the host liquid the vertical force per unit area (magnetic pressure) exerted by the magnetic field on the surface of the bubble cancels the force per unit area (gravitational pressure) exerted on the bubble by the gravitional field.

A static magnetic field, $B^*$, readily penetrates a liquid metal and in this invention an inhomogeneous magnetic field, similar to those generated in conventional magnets, is used to create an approximately zero-gravity field in the cavitation zone of a CFR.

A horizontal magnetic field, $B^*$, is established in the host liquid such that its strength falls off rapidly along a vertical axis from its specified maximum, $B_o^*$. Below the maximum, the gradient of the field is positive (with positive distance upward) and above the maximum the gradient is negative.

At any point in the host liquid, the force due to gravity may be cancelled in the cavitation zone by an upward force due to a magnetic field, which can be calculated to show, that for a given example, $B_o^*$ must be 44 kilogauss in the absence of a bubble and 30 kilogauss in the presence of an H-isotope bubble. Hence, in this example, a value of $B_o^*$ of the order of 30–44 kilogauss would effectively cancel the effect of gravity in the cavitation zone.

The crucial statement is that, by proper design of an inhomogeneous magnetic field, there will be a region in the host liquid where any value of $B_o^*$, equal to or less that the value specified for cancellation of gravity, will also help inhibit the growth of an instability of the bubble interface. Properly designed (as described hereinafter) an inhomogeneous magnetic field counteracts the effect of gravity and creates a "zero-gravity" field in the cavitation zone of the host liquid.

Normally, large seeds placed in a liquid rapidly float to the surface and disappear from the cavitation zone. However, the zero gravity field used in a CFR will cause such seeds to remain in the cavitation zone where they are introduced or generated. Thus such seeds remain at their site of formation and in a Type II CFR do not vanish through diffusion of the H-isotopes into the liquid metal. Similarly, in a Type I CFR a zero-gravity field causes seeds of tritium generated by fusion to remain within the cavitation zone.

CHAMBER REACTIONS

All energy released in a CFR, whether electromagnetic or carried by charged particles or neutrons, is absorbed in the host liquid or in a liquid metal "blanket" surrounding the reaction chamber in which fusion takes place. The nuclear reactions that yield this useful energy at temperatures attainable through operation of a CFR are:

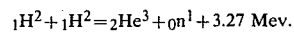

$_1H^2 + {_1H^2} = {_2He^3} + {_0n^1} + 3.27\ \text{Mev}.$ $$_1H^2 + {}_1H^2 = {}_1H^3 + {}_1H^1 + 4.03 \text{ Mev}$$

$$_1H^2 + {}_1H^3 = {}_2He^4 + {}_0n^1 + 17.6 \text{ Mev}$$

$$_1H^3 + {}_1H^3 = {}_2He^4 + 2{}_0n^1 + 11.3 \text{ Mev}$$

$$_1H^1 + {}_3Li^7 = 2{}_2He^4 + 17.35 \text{ Mev}$$

$$_1H^1 + {}_3Li^6 = {}_2He^3 + {}_2He^4 + 4.02 \text{ Mev}$$

The energy released in each reaction is given in Mev (million electron volts).

Neutrons released by cavitation fusion give up their energy to the host liquid, to a moderator surrounding the host liquid, or to the liquid metal blanket until the neutrons have slowed down to speeds at which they interact with lithium or beryllium nuclei and in so doing create tritium and energy through the following reactions:

$$_3Li^6 + {}_0n^1 = {}_1H^3 + {}_2He^4 + 4.8 \text{ Mev}$$

$$_3Li^7 + {}_0n^1 = {}_1H^3 + {}_2He^4 + {}_0n^1 - 2.47 \text{ Mev}$$

$$_4Be^9 + {}_0n^1 = {}_4Be^8 + 2{}_0n^1 = 2{}_2He^4 + 2{}_0n^1 - 2.70 \text{ Mev}.$$

$$_4Be^9 + {}_0n^1 = {}_3Li^6 + {}_2He^4 + e^- - 0.71 \text{ Mev}.$$

When the host liquid is lithium or beryllium, or a mixture of the two metals, and hydrogen isotopes are dispersed in the host liquid, the fusion reactions have as end products only helium and hydrogen isotopes and of these the only radioactive by-product is tritium, which may be contained within the reactor and used as fuel. In the fusion reaction involving $_1H^1$ and $_3Li^7$, the only reaction product is helium-4 and there are no radioactive by-products. These elements —hydrogen, helium, lithium and beryllium—are the most effective moderators of fast neutrons produced in fusion reactions. Both lithium-6 and helium-3 (produced in several fusion reactions) have large capture cross sections for neutrons that have thus been slowed to thermal or threshold energies.

A primary object of this invention, therefore, is to provide a novel method of utilizing the phenomenon of cavitation of a liquid metal to produce a thermonuclear reaction.

Another object of this invention is to provide a novel method of effecting thermonuclear fusion of hydrogen isotopes in a liquid host metal by inducing a cavitation effect in the metal.

A further object of this invention is to provide a novel cavitation fusion reactor for carrying out the reaction taught by this invention, and for utilizing the by-products resulting from such reaction.

Still another object of this invention is to provide a reactor of the type described which is capable of functioning in a regenerative manner to generate tritium which can be used as fuel for the reactor.

A further object of this invention is to provide a novel cavitation fusion reactor which uses metal acoustical horns both for transmitting energy to the liquid metal in the reactor chamber and to conduct fusion heat from the chamber to a heat exchanger disposed externally of the chamber.

Other objects of the invention will be apparent hereinafter from the specification and from the appended claims, particularly when considered in conjunction with the accompanying drawings.

TYPE I CFR

Figure 1:
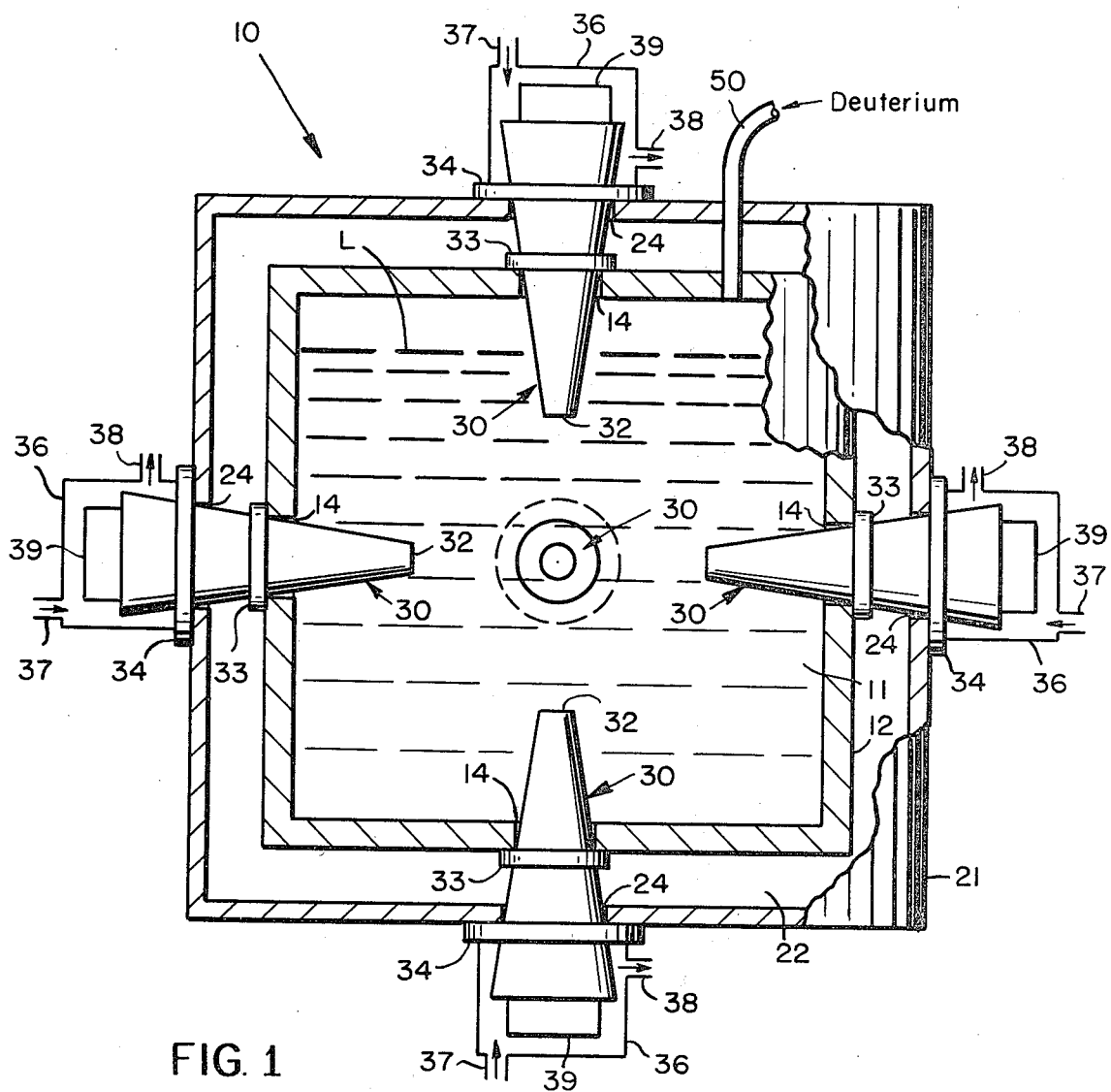
FIG. 1 is a schematic fragmentary sectional view taken through the center of a Type I CFR, which is made according to one embodiment of this invention.

Referring now to the drawings by numerals of reference, and first to FIG. 1, 10 denotes generally a Type I CFR comprising an inner chamber II adapted to contain a host liquid, such as, for example, lithium or an alloy of lithium and beryllium. Chamber 11 is formed by a housing 12 made from a refractory metal such as tungsten, titanium, molybdenum, rhenium or alloys thereof. In the embodiment illustrated housing 12 is shown to be generally cylindrical in configuration, but it is to be understood that its shape can be altered (e.g. to be made spherical) without departing from this invention. Moreover, although specific refractory materials have been suggested, it is to be understood also that refractory metals in Groups IV B, VB and VIIB of the periodic table may also be used provided that the metal used can be easily penetrated by a static magnetic field for reasons noted hereinafter.

Housing 12 is surrounded by a neutron and tritium shield 21, which is similar in configuration to, but larger than, the housing 12. (See Hansborough, L. D., *Tritium Inventories and Leakage: A Review of Some Theoretical Considerations*, pg. 92 in AEC Symposium Series No. 31, The Technology of Controlled Thermonuclear Fusion Experiments And The Engineering Aspects of Fusion Reactors; and Stickney, R. E., *Diffusion and Permeation of Hydrogen Isotopes in Fusion Reactors: A Survey*, pg. 241 in The Chemistry of Fusion Technology (D. M. Gruen, ed.) Plenum Press, 1972). The annular space 22 between housing 12 and shield 21 is adapted to be filled with helium.

Six, solid acoustic horns 30, which are generally truncated-conical in configuration, are used in the embodiment illustrated in order to supply acoustic energy to chamber 11 and to remove fusion heat from the host liquid. Two of the horns project into opposite ends of the chamber 11 coaxially thereof, and the other four project into the chamber medially of its ends, and at 90° intervals about its axis.

Each horn 30 is made of tungsten or another suitable refractory metal, which possesses both high tensile strength and a large value of thermal diffusivity, and is mounted intermediate its ends in registering openings 14 and 24 in the adjacent walls of housing 12 and shield 21, respectively, so that the tip or discharge ends 32 of the horns project equidistantly into chamber 11. Two spaced, external flanges 33 and 34, which are located on each horn at its velocity nodes so that no motion will be imparted to the flanges, are secured to the outer surfaces of the associated walls of housing 12 and shield 21 around the openings 14 and 24, respectively, so that these openings are effectively sealed to prevent any leakage between chamber 11 the surrounding space 22 between housing 12 and shield 21.

Rearwardly of its flange 34 each horn 30 has its outer end enclosed in a heat exchanger housing 36, having an inlet 37 connected to a supply of heat exchange fluid, and an outlet 38 connected to a device which is to receive the heat energy drawn from the reaction that takes place in chamber 11. Also mounted on the outer end of each horn 30 within the associated exchanges housing 36 is a conventional transducer 39, which is operable in a known manner to supply mechanical energy to the associated horn 30. As shown more clearly in FIG. 1, the outer end of each horn 30 and its associated transducer 39 are enclosed within a heat transfer housing 36, so that any heat which is generated in the horn as the result of a fusion reaction in chamber 11 will be transmitted through the horn and transducer 39 to the fluid that circulates in the associated heat exchange housing 36.

Also as illustrated in FIG. 1, the six horns (only five of which are illustrated) are positioned to form three pairs of coaxially disposed horns, with each pair having its axis lying in one of three different planes which intersect one another at right angles. Assuming that the outer surface of each horn 30 is $S_o$ and the inner surfaces $S_i$, the conical taper of the horn causes a broad beam of intensity $I_O$ to change into a narrower beam of intensity $I_i = I_O(S_O/S_i)$. The particle velocity of the narrow beam radiated into the chamber 11 increases as the square root of the ratio $S_O/S_i$. Therefore a decrease in the radius of the horn by a factor of 4 increases the intensity by a factor 16 and the particle velocity by a factor of 2. The pressure in the beam that is radiated from the inner end of each horn increases in the same ratio as the particle velocity—i.e., by a factor of 2. Consequently with the arrangement as illustrated in FIG. 1, when each horn increases the pressure by a factor of 2, the six horns increase the total pressure in the cavitation zone (the volume in chamber 11 where the beams from the horns intersect) by a factor of 12. Thus a pressure of 10 bars at $S_O$ of each horn becomes a pressure of 120 in the cavitation zone.

Instead of using six transducers 39 as described above, it would be possible to use an array of three transducers, so arranged that there is a reflecting acoustical mirror opposite each inner surface of a horn 30. Such as arrangement will concentrate the acoustical energy in the cavitational zone as before, but the design decreases the number of holes that must be made in the walls of the housing 12 defining the chamber 11. Refractory metals such as tungsten make effective mirrors because their characteristic acoustic impedances are 30 times greater than that of lithium at 1000° K. and the pressure reflection coefficient of such a mirror would be of 0.94.

Figure 2:
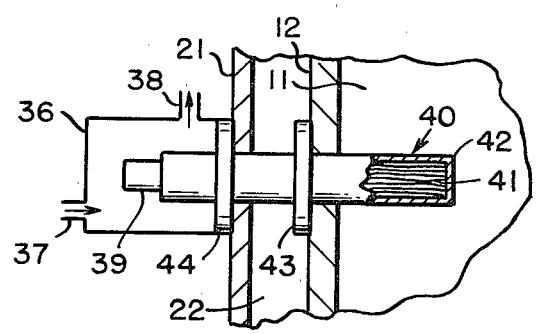
FIG. 2 is a fragmentary sectional view of part of a modified form of the CFR shown in FIG. 1, and illustrating an alternative form of acoustical horn which may be employed in the CFR.

Although solid horns 30 have been specified in FIG. 1 as a means of transferring acoustical energy in the reaction chamber 11, and to extract heat from the chamber, this dual function could also be performed, as desired, by a modified acoustical horn of the type denoted at 40 in FIG. 2. Each such horn 40 may comprise a bundle 41 of metal fibers made of a refractory metal such as tungsten, and enclosed or encased within a shield or housing 42 made of the same material (tungsten, for instance). As in the case of the previous embodiment, housing 42 has thereon a pair of external flanges 43 and 44, which seat against the outsides of the walls of housings 12 and 21 to secure the housing 42 in the registering openings in these walls so that the forward end of each housing 42 projects into chamber 11.

The outer end of each housing 42 projects into a heat exchange housing 36 through which fluid flows, as in the case of the first embodiment, to remove heat which is transferred by the horn 40 from chamber 11 to the exterior of the shield 21. Also as in the first embodiment a transducer 39 is secured to the outer end of horn 40 for supplying energy thereto.

The advantage of the embodiment shown in FIG. 2 is that the removal of heat from the fiber bundle is facilitated by the large increase in the surface area in contact with the heat transfer fluid. If desired, the external end of the fiber bundle 41 may be attached to a solid horn which is disposed outside of the chamber 11.

In use of CFR of the type denoted at 10 has its chamber 11 approximately filled with a host liquid, such as lithium or an alloy thereof, to a level denoted at L in FIG. 1, so that the tip of the horn 30 which projects downwardly from the upper wall of housing 12 is immersed in the host liquid. Preferably this host liquid is purified of all gases, such as oxygen and nitrogen, before the H-isotopes are introduced. The reaction chamber 11 is likewise degassed, further helping to reduce corrosion of its walls.

Thereafter H-isotopes are distributed into the host liquid by feeding deuterium through a tubular conduit 50 into the top of chamber 11 above the surface L of the liquid host. Conduit 50 is connected at one end to a supply of deuterium, and at its opposite ends extends through registering openings in the shield 21 and the upper wall of housing 12.

One mode of operation of a Type I CFR requires the introduction only of hydrogen ($_1H^1$ of h) into the lithium, and the fusion reaction is between this isotope and lithium. However, in the example described in connection with the CFR as illustrated in FIGS. 1 or 2, the mole fraction $Y_H$ of hydrogen is taken to be zero initially, and the mole fraction of deuterium $Y_d$, and the mole fraction of tritium $Y_t$, in the steady state are taken to be equal, and their sum $Y_d + Y_t$ is approximately 0.1. The rate at which the reaction (d, t,) occurs in the liquid host is proportional to the product $Y_d$ and $Y_t$, and thus this product should be as large as possible without making the liquid metal more compressible. The tritium inventory is built up in the host liquid by generating tritium from deutrium alone in the CFR during the start-up phase.

The concentration of deuterium is maintained by the appropriate "dissociation pressure" (pd*) over the surface of the host liquid. This pressure is a function of the mole fraction of H-isotopes dissolved into lithium and of the operating temperature. For a combined mole fraction of 0.1 of H-isotopes and the range of operating of temperatures specified hereinafter, this pressure would be on the order of 50 mm. Hg or less. The initial concentration of tritium is renewed by the fusion reactions and by its production in neutron capture by lithium. Also, the distribution of seeds in the host liquid will be very small bubbles that nucleate on minute inhomogeneities such as fragments of the various hydrides that can form in the host liquid.

The operating or ambient temperature must be greater than the melting point of the hydrides that can form and less than about 1200 K., so in practice the range of temperature is approximately 1000 K. to 1200 K. In order to assist nucleation of seeds, the ambient temperature must be lowered to the melting point of the hydrides and then raised back to the operating temperature. An external heat source will initially bring the reaction chamber 11 to the operating temperature and thereafter the temperature is maintained by the heat that is caused from fusion.

The operating or ambient pressure in chamber 11 is the sum of the hydrostatic pressure plus the gas pressure maintained above the surface of the host liquid and the vapor pressure of the liquid itself. Typically it is on the order of 1.0 bar or less.

For proper operation a magnetic field that is inhomogeneous in the vertical direction (as illustrated in FIG. 1) and uniform in a horizontal direction is created in the host liquid by an external source.

For an H-isotope bubble in liquid lithium, a magnetic field $B^*$ with a maximum $B_0^*$ of the order of 30-44 kilogauss will approximately cancel the effect of gravity in the cavitation zone. The maximum is positioned above the cavitation zone and for the values specified here approximate cancellation occurs over a range of 4 cm., if the vertical gradient of the magnetic energy density is designed to be constant over that interval and $B^*$ becomes negligable outside that range. It is important to state that a value of $B_0^*$ less than that specified will still be effective in helping inhibit the growth of an instability of the interface. This zero gravity field can also be created by the forced acceleration of the host liquid as a whole in such a manner that the acceleration cancels the effect of gravity during the collapse of bubbles. A device such as an electromagnetic "shaker" causes the reaction chamber 11 to vibrate along a vertical axis. By choosing the proper magnitude and frequency of vibration, the shaker imparts to the reaction chamber 11 a downward acceleration during part of the vibration cycle so that the host liquid is essentially in "free fall" during the interval. The expansion-compression cycle of the cavitation bubbles is timed so that collapse of the bubbles occurs during the zero gravity interval created by the vertical vibration.

It should be noted that magnetic fields are widely used in industry to separate particles from paramagnetic fluids. Magnetogravimetric separation, for example, involves transformation of magnetic forces into hydrostatic pressures wherein "levitation" of immersed particles can occur. This technique therefore may also be applied, if desired, to provide the necessary zero gravity parameter required to perform applicant's process as disclosed herein. (See, e.g., Zimmels, Y., Y. Tuval and I. J. Lin, IEEE Transactions O. Magnetics, *MAG*-13, 1047 (1977) *Principles of High Gradient Magnetogravimetric Separation;* Rowlands, G., IEEE Transactions of Magnetics, *MAG*-13, 992 (1977) *Magnetostatic Energy of Parametric Particles in Magnetic Separators.*)

At an operating temperature of 1000 K., the thermal diffusivity of tungsten is 1.2 times greater than that of liquid lithium. Hence the use of solid metal horns 30 or fiber bundles 41 of tungsten provide an effective way in which to remove fusion heat from the liquid lithium and transfer it out of the reaction chamber 11. These horns or fiber bundles simultaneously transfer mechanical energy from external acoustic transducers 39 to the liquid lithium and transfer heat from the lithium to an external heat reservoir. In this manner, the liquid lithium remains in the reaction chamber 11 and all difficulties associated with pumping a hot, corrosive liquid metal are avoided. Heat is removed from the external portion of the horns or fiber bundles by direct contact with a heat exchange fluid that circulates in housing 36. This use of a coolant in direct contact with the horn also serves to keep the outer face of a horn and any transducer attached to it at a constant temperature.

Additional heat transfer may also be provided by circulating the helium from the space 22 between the housing 12 and the shield 21 through a heat exchanger.

The solid metal horns may be driven at their outer surfaces in one of a variety of ways:

a. An array of piezoelectric or piezomagnetic ceramic shapes or crystals with a high Curie point.

b. An electrodynamic driver element that is not in actual contact with the outer horn surface. This device may be one similar to those described by Seeman and Staats [Seeman, H. J., and H. Staats, *Acustica* 6, 326-334 (1956)] for steady-state operation or a device such as that described by Eisenmenger [Eisenmenger, E., *Acustica,a* 186-202 (1962)], for generation of intense pressure pulses.

c. The outer face of the horn may be the termination of an acoustic transmission line driven by a remote source of acoustic energy.

The permeation of tritium through the wall of housing 12 of the reaction chamber 11 is inhibited by electrically isolating the shield 21 from the horns 30 or 40 and then placing a negative voltage on the reaction chamber and grounding a metal shell in or on the shield. H-isotopes such as t exist as ions when dissolved in metals and an electric field of the specified direction at the surface of the reaction chamber will drive the tritium back into the interior of the chamber. If tritium does escape from the reaction chamber, it will mix with the helium and then be removed from that inert gas by a variety of ways when it is circulated as a heat exchange medium.

A specified deuterium pressure $p_d^*$ is maintained over the level L or surface of the liquid lithium in chamber 11 by connection of conduit 50 to an external reservoir of deuterium.

Tritium generated in the cavitation zone will be concentrated in the zone by the flow of acoustical energy into that region of the host liquid. A fundamental requirement that has been placed on the acoustic field in this example of a Type I CFR is that one pressure cycle consist of a negative pressure of specified amplitude followed by a positive pressure whose amplitude typically is twice that of the negative pressure. Thus on an average the pressure will be a maximum in the cavitation zone and decrease with distance toward the wall of the chamber 11. There will thus exist a negative pressure gradient in the liquid lithium. This pressure gradient will cause the H-isotopes to diffuse toward the center of the cavitation zone relative to the liquid metal. In this manner the specified acoustic pressure field will itself be used to help contain the tritium generated in the cavitation zone, and thus meet a primary design requirement.

In a steady state field, there may also be acoustic streaming that causes a flow of the liquid lithium from the inner surface of the horn to the cavitation zone. Such flows set up rotational patterns of convection that may also help contain tritium in the cavitation zone. In a given mode of operation, streaming or the negative pressure gradient may be more effective in this containment. Streaming can be eliminated by using short burts of a few cycles of negative-positive pressures while at the same time an average negative pressure gradient is maintained.

TYPE II CFR

The Type II CFR maximizes the production of tritium and other useful products through thermonuclear fusion inside collapsing bubbles. The bubbles contain H-isotopes and vapor of the host metal and, in one mode of operation, lithium vapor as well. In a Type II CFR fusion is brought about by the high temperatures and pressures caused by adiabatic compression of the bubbles' contents in the terminal phase of collapse. The host liquid is tin, although any one of the several gamma-type metals such as indium, thallium or gallium may be used. Characteristics of tin that make its selection useful are its low vapor pressure over a wide range of operating temperatures, the very low or zero solubility of H-isotopes of hydrogen in the liquid, and the instability of its hydrides in the range of operating temperatures. Although H-isotopes dissolve in it, aluminum may also be used in a Type II CFR as the host liquid.

The use of tin as the host metal requires that its container be surrounded by a layer or "blanket" of lithium or a lithium-beryllium alloy in order to generate tritium for use as a fuel. The blanket of Li or Li-Be will be referred to hereafter as the Li-blanket for brevity. The Li-blanket is separated from the host liquid by a neutron moderator to be described below as part of the reaction chamber. Tin has small collision and capture cross sections for neutrons and the function of the moderator is to reduce the energy of fast fusion neutrons to the range where they have a high probability of interacting with Li and Be and producing tritium. The Li-blanket is at an operating temperature at which removal of tritium is simply effected by acoustic means. A low amplitude acoustic field (as constructed with the high amplitude acoustic field in the cavitation zone) applied to the Li-blanket will cause any small aggregation of tritium atoms to grow into bubbles that will rise to a surface of the blanket or aggregate in specified regions as described below.

The host liquid, tin, will contain little or no dissolved H-isotopes. Seeds containing such isotopes will be relatively large, with equivalent radii of $10^{-3}$ to $10^{-2}$ cm. Although a variety of methods may be used to introduce seeds into the host liquid, a specific method will be described below. When such seeds are introduced into the host liquid below a zero-gravity field caused by an inhomogeneous magnetic field, the seeds rise until they enter the zero-gravity region in the cavitation zone. The seeds remain essentially unchanged in the cavitation zone until they are caused to expand and collapse by the applied acoustic pressure field. A bubble may then either reform as a seed in the cavitation zone and repeat the expansion-collapse cycle or be ejected from the cavitation zone by hydrodynamic forces or be released by pulsing of the magnetic field.

The operating temperature is in the range of 1400 to 1500 K, although lower temperature may be specified. At 1400 K, the vapor pressure of tin is $1.44 \times 10^{-4}$ mm hg or approximately 0.1 N m$^{-2}$. At that temperature, the vapor pressure of lithium is 129.4 mm Hg.

The Li-blanket will contain only low concentrations of tritium that will be removed by acoustic degassing at interior regions. Hence the operating, or ambient, pressure will have little effect on permeation of tritium through structural walls containing either liquid tin or liquid Li or Li-be. While the precautions for containment of tritium described in connection with the Type I CFR will be retained, the choice of the operating pressure, Pl$_n$, may be either low (of the order of 1 bar or less) or high (of the order of several hundred bars), depending on the mode of operating of the Type II CFR that is specified.

In both the Type I and Type II CFR's, the applied or acoustic, pressure is a sequence of a negative pressure of 50-100 bars followed by a positive pressure of 100-200 bars.

As in a Type I CFR, a magnetic field that is uniform in a horizontal direction but inhomogeneous in the vertical direction is created in the host liquid (and in the Li-Be blanket as well) by an external source. The host metal, tin, is diamagnetic in the liquid state and has a susceptibility, $\chi_L = 3.02 \times 10^{-6}$. H-isotopes are also diamagnetic with a susceptibility $\chi_c = -2.48 \times 10^{-5}$. Here we have two possible specifications for the magnetic field:

1. In order to cancel the gravitation force in the liquid in the cavitation zone in absence of a bubble, the maximum of the magnetic field, $B_o^*$, should be 466 kilogauss and be located below the cavitation zone.
2. In order to cancel the gravitational force in the host liquid in the presence of a bubble, the difference $\chi_L - \chi_c = +2.17 \times 10^{-5}$, fixes the maximum, $B_o^*$, at 174 kilogauss and locates it above the cavitation zone.

The magnetic field required for gravity cancellation in tin is approximately six to 10 times larger than that required in lithium. When aluminum is used as the host liquid, the range of $B_o^*$ is 76-127 kilogauss.

The very large magnetic field required for gravity cancellation in a Type II CFR on the earth's surface makes the alternative specification for operation of a Type II CFR in a space vehicle in zero gravity flight an advantageous one.

Large bubbles such as those employed in a Type II CFR normally float to the surface of the host liquid or dissolve. By choice of tin as the host liquid, the solubility of H-isotopes in the host liquid is negligible and bubble will dissolve very slowly, if at all. By creation of a zero-gravity field in the cavitation zone, a bubble placed in the cavitation zone will remain unless ejected by force in the acoustic pressure field or hydrodynamic forces during collapse.

Figure 3:
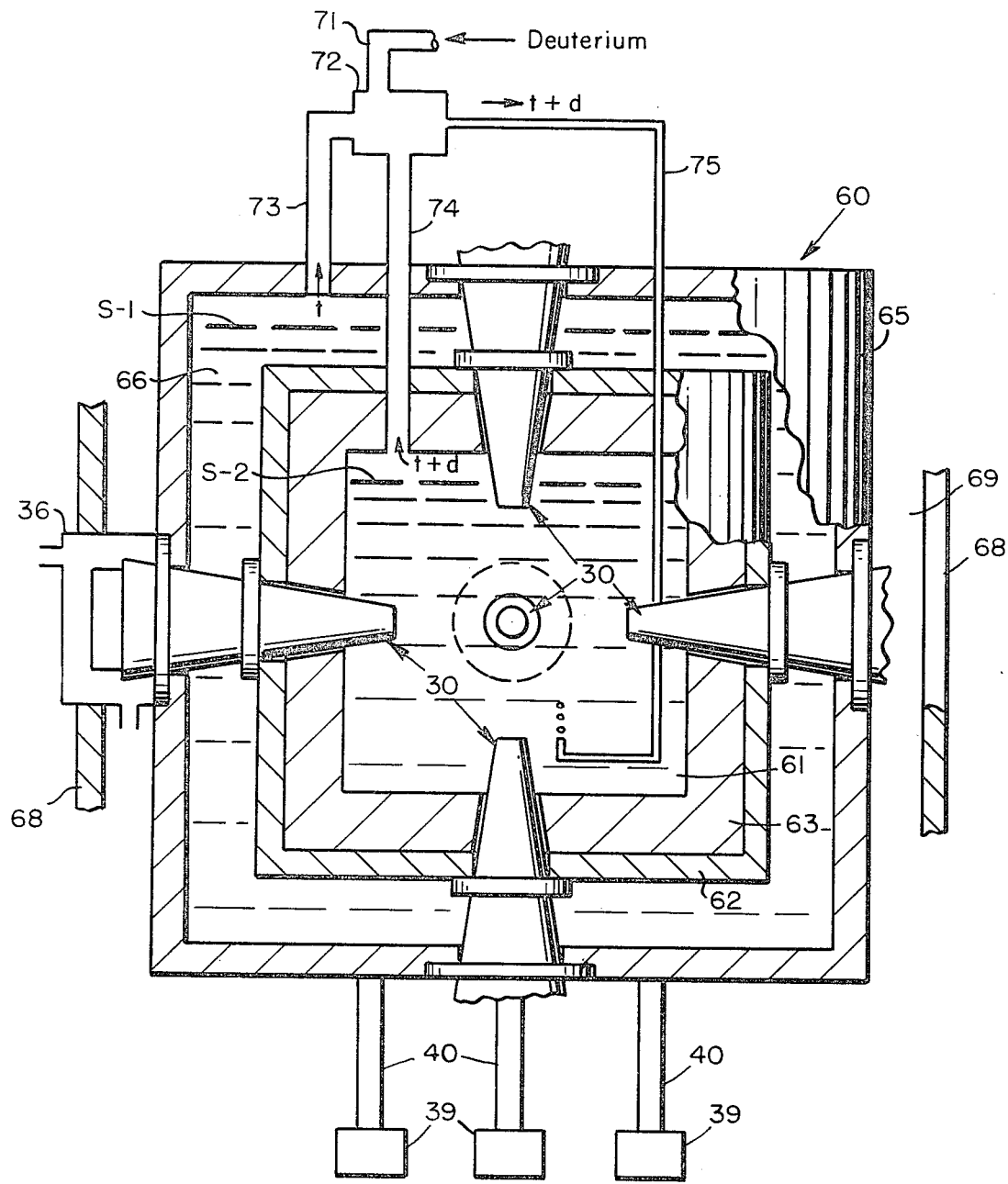
FIG. 3 is a schematic, fragmentary sectional view taken through the center of a Type II CFR, which is made according to another embodiment of this invention.

Referring now to FIG. 3, 60 denotes generally a Type II CFR having a fusion chamber 61 formed inside of a cylindrical, inner housing 62, which, for example, is made of tungsten, and which is lined with a solid layer 63 of beryllium. Housing 62 is surrounded in radially spaced relation by a second cylindrical housing 65, which may also be made of tungsten. The space between housings 62 and 65 contains a liquid metal 66, such as a lithium-beryllium alloy, which forms the above-noted Li-blanket between the housings. The outer housing 65 is, in turn, enclosed within a neutron-tritium shield 68, which is similar to the shield referred to in the first embodiment. Also as in the first embodiment, the annular space 69 between the shield 68 and the outer housing 65 is filled with a gas such as helium, or the like. The Be-blanket 63 functions as a moderator, which slows neutrons down to energies at which they react with the Li-blanket to produce tritium. The outer surface of the reaction chamber housing 62 and the outer cycliner 65 are made of tungsten because these surfaces are in contact with the Li-blanket. The beryllium moderator layer 63 has fairly good corrosion resistance to liquid tin even at elevated temperatures, and any beryllium that dissolves will only enhance the properties of the host liquid- for example, the host liquid will become less compressible.

The concentration of dissolved H-isotopes in the Li-blanket and in the liquid tin will be relatively small, and the problem of containment of tritium in this Type II CFR is correspondingly less than in the case of the CFR shown in FIG. 1.

For supplying acoustic energy to the host liquid, an array (for example, six) of acoustical horns 30, which may be similar to the solid tungsten variety employed in the first embodiment, are mounted intermediate their ends in central, registering openings in the housings 62 and 65 so that their tapered or pointed ends project centrally into the chamber 61 in spaced relation to each other. As in the case of the first embodiment, each of these horns has associated therewith a heat transfer housing 36 for removing heat from the chamber 61 when the CFR 60 is operated as a generator of energy.

For providing low-power acoustic energy to the Li-blanket 66, another plurality of acoustical horns 40, which may be similar to the tungsten fiber-type horns illustrated in FIG. 2, are mounted on housing 65 for operation by their associated transducers 39. While in the embodiment illustrated in FIG. 3 only three such low-power transducers 39 and their associated tungsten fiber bundles 40 are illustrated, it is to be understood that additional such horns could be employed as desired.

Fuel is supplied to chamber 61 in the form of a mixture of deuterium and tritium. The deuterium is supplied from an external source by means of a pipe 71, which is connected to one inlet of a combination pump and mixer 72. In the steady state operation of CFR 60 the necessary tritium inventory is maintained by the "breeding" of tritium in the LI-blanket 66. The initial "charge" of tritium is created in the lithium either by fusion reaction between deuterium nuclei alone in the CFR, or by neutrons from an external source. The fusion reactions between deuterium nuclei generates both tritium in the reaction chamber 61 and in the blanket 66 by reaction of fusion neutrons. This initial distribution of tritium is then renewed by reactions of Li and Be with neutrons from fusion reactions in the collapsing bubbles. The tritium generated in the blanket 66 aggregates into seeds, which are made to grow into large bubbles by application thereto of a low-amplitude acoustic field through the horns 40. This field causes the seeds to grow by a process called rectified diffusion, which forces tritium into the bubbles.

In operation, a zero-gravity field is created, as above, by a horizontal magnetic field, $B^*$, in a small, central region parallel to the horizontal axis of the magnetic field. This zero-gravity field exists in the liquid Li-blanket as well as in the liquid tin in the reaction chamber 61. Tritium bubbles that form in the blanket 66 above the zero-gravity field float to the surface S-1, and those that form in or below the zero-gravity field are trapped in it. By pulsing the magnetic field at intervals, the trapped tritium is released and floats to the surface S-1 where it is removed by pumping. It may be used as fuel at another fusion reactor or as shown in FIG. 3, it may be mixed with deuterium by drawing it through pipe 73 to the pump 72. At the pump it is mixed with deuterium and is then used to seed the liquid tin in chamber 61 as noted hereinafter.

The Li-blanket is at approximately the same temperature as the host liquid, and the process of extracting the tritium from the blanket is helped by this high temperature. When the magnetic field is pulsed, bubbles of deuterium and tritium trapped in the cavitation zone also will be released and will float to the surface S-2 of the host liquid chamber 61, where the gases above the liquid are removed by pumping through pipe 74 to the pump 72. From the pump a mixture of tritium and deuterium is fed into the cavitation zone by a small tungsten capillary tube 75 that opens into the liquid tin below the cavitation zone. The pressure on the gases in the tube 75 is maintained at a value needed to force small bubbles of a desired size into the liquid tin at a specified rate.

It is to be understood that in the embodiment shown in FIG. 3 the neutron-tritium shield 68 and the enclosed protective helium atmosphere in space 69 are design features which are illustrated only schematically in the drawing. Likewise, it is to be understood that any of the methods of supplying acoustic power as described in connection with the embodiment in FIGS. 1 and 2 can be employed to supply acoustic power to the cavitation zone in the Type II CFR. The freedom to operate a Type II CFR at an elevated ambient pressure, $p_{ln}^*$, makes it possible to use single negative pressure pulses in causing cavitation in the cavitation zone. The required positive pressure pulse is then produced by reflection of the negative pulse from a low acoustic impedance surface such as the free surface of the host liquid.

One of the advantages of this design of a Type II CFR is that the installation does not require the pumping of either liquid lithium or liquid tin. Moreover, the energy released by fusion in this Type II CFR may be enhanced by introducing fissile material such as thorium or uranium in sub-critical amounts into the Li-blanket. Thermalized neutrons that reach the blanket would then interact with such heavy element to produce fission as well as Li (and Be) to create tritium.

In the mode of operation in which fusion occurs between lithium and ordinary hydrogen, bubbles of $_1H^1$ and lithium vapor are introduced in the host liquid (for example, as particles of LiH) and stabilize as seeds in the zero-gravity cavitation zone. In this mode of operation, no neutrons are created and tritium is not required for operation of the CFR, and consequently the Be-moderator and the Li-blanket are omitted from this design of a Type II CFR.

CALCULATED GAIN IN ENERGY AND TRITIUM IN CAVITATION FUSION REACTORS

Two examples of the operation of cavitation fusion reactors (both Type I CFR and Type II CFR) are described hereinafter. In each a seed of equivalent radius, $R_n^*$, in a specified host liquid grows into a bubble of maximum radius $R_o^*$, and then collapses to a minimum radius, $R_m^*$. In the expansion, a negative pressure does $W_o^*$ Joules of work on the bubble and, in the collapse, a positive pressure does $W_c^*$ Joules of work on the bubble. Hence, in the cycle of expansion and collapse, $W_m^* = W_o^* + W_c^*$ Joules of mechanical energy is transferred to the bubble by the applied, acoustic pressure field. The object of these calculations is to show that there is a net gain in energy and tritium produced by thermonuclear fusion in such a cavitation event.

During most of the cycle of expansion and collapse, the liquid and the contents of the bubble remain at the operating, or ambient, temperature, $\theta_n^*$. However, as the interface of the bubble accelerates inward during collapse, there occurs a transition from isothermal to adiabatic compression of the bubble's contents and of the liquid shell surrounding the bubble. Once the compression of the liquid and the bubble contents has become adiabatic, collapse continues until the inward motion is arrested by high pressures and temperatures at a minimum radius, $R_m^*$. At or near the minimum radius, an intense shock wave is radiated into the liquid.

These motions and the resulting pressures and temperatures in the liquid and in the bubble are calculated using a mathematical formalism applicant has developed for cavitation dynamics (*J. ACOUST. Soc. Am.* 57, 1379–1396 (1975) and 58, 1160–1170 (1975) "Cavitation Dynamics I, A Mathematical Formulation" and "Cavitation Dynamics II, Free Pulsations And Models For Cavitation Bubbles"). The set of differential, integral and algebraic equations developed there permit reliable calculations to be made of the behavior of cavitation bubbles under a wide variety of conditions.

GAIN OF A TYPE I CFR

In a Type I CFR thermonuclear fusion occurs mainly between H-isotopes dissolved in the host liquid. During collapse of a bubble both its contents and a thin shell of liquid surrounding it are compressed adiabatically. When the bubble reaches its minimum radius, the interface remains essentially at rest for an interval of the order of 10 picoseconds ($10^{-11}$sec.). In this interval the bubble radiates an intense shock wave that compresses the liquid shell a second time. Temperatures and pressures in the liquid behind the shock are high enough to cause thermonuclear fusion of the H-isotopes dissolved in the liquid metal. This liquid shell in which fusion takes place is called the "fusion shell". In the fusion shell behind the expanding shock, thermonuclear fusion adds enough energy to the liquid to maintain the strength of the shock as it encloses an increasing volume of liquid. Because the strength of the shock remains constant, the temperature and pressure are the same throughout this volume and thermonuclear fusion occurs at a constant rate throughout this expanding sphere. When the interface starts to move appreciably, it generates a rarefraction wave that eventually destroys the shock. In this second interval (also of the order of 10 picoseconds), in which the rarefraction wave is overtaking the shock, the fusion shell still propagates outward with a uniform rate of energy production per unit volume but with a decreasing thickness. However, the decrease is small in 10 picosec.

In the example of operation of a Type I CFR described hereinafter, the fuel is a mixture of tritium and deuterium, and the host liquid is lithium. The operating temperature is 1200 K., the ambient pressure is taken to be one bar, and a pressure, $p_v^* + p_h^*$, of 0.127 bar is maintained over the surface of the liquid lithium vapor and H-isotopes. The dissolved mole fraction, $Y_t$, of tritium is 0.05 and the dissolved mole fraction $Y_d$, of deuterium is 0.05 in the steady state.

The calculation assumes that in the cavitation zone of the reactor there is a seed of t and d with an equivalent radius, $R_n^* = 2 \times 10^{-5}$ cm. The specification of the seed of this size is an arbitrary, but convenient, choice because the exact amount of H-isotopes initially in the very small seeds used in a Type I CFR is irrelevant to the subsequent motion of the bubble. Whatever the content of the seed, the pressure of vapor and gas in the expanding bubble quickly reaches the equilibrium value, $p_v^* + p_h^*$, determined by the ambient temperature and is maintained at this value during the expansion and most of the collapse of the bubble.

When a negative pressure is applied to the cavitation zone, the seed expands to a maximum radius, $R_o^* = 2.68 \times 10^{-1}$ cm. The work done by the acoustic field in expanding the bubble is $7.52 \times 10^{-3}$ joules. While the bubble is at this maximum size, a positive pressure of $+100$ bars is applied to the cavitation zone and the work done by the acoustic field in compressing the bubble is $8.11 \times 10^{-1}$ joule. Thus the total mechanical work, $W_m^*$, transferred to the bubble is $8.19 \times 10^{-1}$ joule.

Condensation of vapor and diffusion of H-isotopes is assumed to cease during collapse when the amount of gas and vapor in the bubble is that of a bubble of equivalent radius, $R_n^* = 2 \times 10^{-4}$ cm. This transition occurs when the radius of the bubble is 100 times greater than the radius of the initial seed.

The transition from isothermal to adiabatic compression is found to occur when the radius of the bubble is approximately $3 \times 10^{-4}$ cm. That is, the transition occurs roughly in the vicinity of the new equivalent radius (a result that holds for most collapsing bubbles).

The bubble collapses to a minimum radius of $R_M^* = 1.19 \times 10^{-6}$ cm. At this minimum radius, the temperature in the bubble rises to a maximum of $T_m^* = 4.22 \times 10^7$ K. and the pressure in the bubble to a maximum of $p_m^* = 1.67 \times 10^{12}$ bars. The temperature in the liquid at the interface is $2.64 \times 10^7$ K. and the density of the liquid at the interface is $1.69 \times 10^3$ gm cm$^{-3}$.

A shock wave with a constant strength equal to this maximum, $p_m^*$, then propagates into the liquid from the bubble. As the shock wave moves outward, the interface remains relatively at rest for a time interval of 25 picoseconds ($25 \times 10^{-12}$ sec.). However, in this calculation this interval is taken to be only 10 picoseconds.

In those 10 picoseconds, thermonuclear fusion of tritium and deuterium in the fusion shell enclosed by the shock releases an amount of energy equal to 3.24 joules. Hence the gain in energy released as heat over the mechanical energy supplied to the bubble is 3.96, or, approximately, the energy gain is 4.

When the applied positive pressure is increased to $+200$ bars at the start of collapse (and all other parameters held fixed), the same bubble collapses to a minimum of $1.06 \times 10^{-6}$ cm. (that is, $R_m^* = 1.06 \times 10^{-6}$ cm.). The total mechanical work done on the bubble by the acoustic field is now $W_m^* = 1.75$ joules. The maximum temperature reached in the bubble is $6.27 \times 10^{-7}$ K. and the maximum pressure is $3.50 \times 10^{12}$ bars. The temperature in the liquid at the interface is $3.5 \times 10^7$ K. and the density of the liquid at the interface is $2.59 \times 10^3$ gm cm.$^{-3}$. As the intense shock wave propagates outward in the liquid with a strength $p_m^* = 3.50 \times 10^{12}$ bars, fusion reactions between tritium and deuterium in the lithium produce an amount of energy equal to 43.85 joules in the time interval of 10 picoseconds. Hence the gain in energy released as heat over mechanical energy supplied to the bubble is 25.06. Hence, approximately, the energy gain is 25, even though the mechanical energy absorbed has only doubled.

The rate of energy production in fusion reactions depends on the square of the density of the medium as well as being a complicated function of temperature, and it is the large increase in density within the fusion shell of the host liquid that makes these net gains in energy produced possible. In both calculations of the energy gain from a Type I CFR, the time interval during which thermonuclear fusion takes place in the fusion zone was in all probability underestimated by a factor of at least two.

Studies of tritium "breeding" in blankets of Li or Li-Be show for that each neutron produced in the (t,d) reaction there will be on an average up to two tritium nuclei produced by reactions of the fusion neutrons with Li or Be nuclei. Hence a reasonable multiplication factor for tritium in the host liquid for a Type I CFR is 1.5 tritium nuclei per fusion nuclei. This factor means that the tritium produced in the host liquid more than replaces the tritium used as fuel in the reaction chamber and that only deuterium need be added to keep the process in operation. The tritium remains in solution in the liquid lithium until it is consumed by thermonuclear reactions in the fusion shell of a collapsed bubble.

In the example above where the applied negative pressure is $+200$ bars, the neutrons released create $2.06 \times 10^{13}$ tritium nuclei or $3.4 \times 10^{-10}$ mols of tritium. This amount of tritium produced by a single cavitation event is that contained in a bubble with an equivalent radius of $R^* = 10^{-2}$ cm. (as compared with the initial seed with $R_n^* = 2 \times 10^{-5}$ cm.). As noted, this tritium will be dispersed in the liquid lithium until another cavitation event consumes it as fuel.

When the calculation is repeated for a seed that expands to a maximum radius of $2.68 \times 10^{-1}$ cm. as before but in liquid lithium containing a mole fraction, $Y_d$, of deuterium alone, it is found that energy produced by fusion is less than the mechanical work done on the bubble in the expansion-collapse cycle. Thus, when a positive pressure of $+200$ bars is applied at the start of collapse, the ratio of energy generated to mechanical energy absorbed is only 0.48. However, each such cavitation event causes the thermonuclear fusion of $2.64 \times 10^{11}$ deuterium nuclei. There are two channels for the (d,d) reaction:

$$d+d=t+h$$

$$d+d={}_0n^1+{}_2He^3$$

which have almost equal probability of occuring. Thus fusion of four d-nuclei produce one tritium nucleus and a neutron, in addition to a proton and a helium-3 nucleus. Hence a multiplication factor of 1.5 yields 2.5 tritium nuclei for every four d-nuclei that undergo fusion. In this example, a single cavitation event produces $616 \times 10^{11}$ tritium nuclei or $1.09 \times 10^{-12}$ mols of tritium. This amount of tritium is that contained in a bubble whose equivalent radius is $5 \times 10^{-3}$ cm.

The conclusion is that an inventory of tritium sufficient for steady state operation of a Type I CFR can be built up rapidly by operation of the reactor with deutrium alone as fuel in the start-up phase. It is assumed above that the cavitation event takes place in a zero gravity field. In these examples of operation of a Type I CFR, the amount of energy generated by thermonuclear fusion within the bubble is always negligible compared with that released in the fusion zone surrounding the collapsed cavity.

In summary, operation of a Type I CFR is such that:
a. When a useful gain of energy results from a cavitation event in a Type I CFR, the work, $W_o^*$, done by the negative pressure in expanding the bubble to its maximum radius, $R_o^*$, is much less than the mechanical work, $W_c^*$, done by the positive pressure during collapse. Typically, the ratio of work done on the bubble during collapse to work done during expansion is of the order of 100.

b. In a Type I CFR, the mechanical work, $W_o^*$, done in expanding a bubble from its initial radius, $R_n^*$, controls the maximum radius, $R_o^*$, that it reaches. The work, $W_o^*$, is chosen so that $R_o^*$ is of the order of $10^{-1}$ cm. or less and the expansion ratio, $R_o^*/R_n^*$, is of the order of $10^3$ or $10^4$.

c. In a Type I CFR, for a specified value of $R_o^*$, the mechanical work, $W_c^*$, done on the bubble in collapse controls the maximum pressures and temperatures reached in the host liquid and in the bubble and hence controls in fusion energy, $E^*$, released in the cavitation event.

d. A Type I CFR is an amplifier whose output of fusion energy, $E^*$, for a single cavitation event of specified $R_o^*$ is a non-linear function of the mechanical input work, $W_c^*$, that increases more rapidly than the third power of $W_c^*$.

GAIN OF TYPE II CFR

In a Type II CFR, relatively large seeds of H-isotopes are used. Typically, their initial radii are 50 to 100 times larger than those used in a Type I CFR, and their volumes are consequently $10^5$ to $10^6$ greater. Larger seeds are required because fusion reactions in a Type II CFR takes place mainly between H-isotopes within bubbles and not in the liquid. Hence the amount of H-isotopes in a seed places an upper limit on the amount of energy that may be released in fusion reactions caused by a collapsing bubble in a Type II CFR.

In a Type II CFR there is a transition from isothermal to adiabatic compression of the bubble contents during collapse and it is this adiabatic compression that raises the temperature and pressure within the bubble to values where thermonuclear fusion takes place. The temperature rise in the liquid could cause only a negligible number of fusion reactions of H-isotopes in the liquid (whose mole fraction in any event is very small).

The host liquid in a Type II CFR is normally a gamma-metal such as tin, indium, gallium or thallium, which neither dissolve or react with hydrogen in the temperature range of interest. In the example of the operation of a Type II CFR described here, however, the host liquid is aluminum because its equation-of-state data have been established experimentally well into the megabar region of pressure. Aluminum closely resembles a gamma-metal except that hydrogen does dissolve in it freely. In this calculation, it was assumed that aluminum acts like gamma-metal in all respects.

Calculations are made for the gain in tritium produced in the Li-blanket over the tritium consumed as fuel in fusion reactions for:
1. An operation in which a mixture of deuterium and tritium is used as fuel,
2. An operation in which deuterium is used as fuel alone.

The calculations that were made show that:
a. There is a net gain in the production of tritium when a mixture of deuterium and tritium is used as fuel in the steady state operation of a Type II CFR.
b. Start-up operation of a Type II CFR can be accomplished by use of deuterium alone as fuel.

In this example, the host liquid is aluminum, the operating temperature is 1500 K., the ambient pressure is 1 bar and the vapor pressure of the liquid metal is $4.96 \times 10^{-5}$ bars.

There is a zero-gravity field in the cavitation zone of the reactor. Hence seeds containing a mixture of H-isotopes introduced into the cavitation zone will remain there. Because the host metal is a gamma metal, the seed will not dissolve and, in the absence of an acoustic field, a distribution of seeds remains relatively stationary both in space and time. Another consequence is that the gas content of a bubble remains constant throughout the expansion and collapse phases.

The calculation assumes that a seed with an equivalent radius of $R_n^* = 10^{-3}$ cm. and containing equal mole fractions of deuterium and tritium is placed in the cavitation zone of the reactor. A negative pressure of $-100$ bars causes the seed to expand to a maximum of $R_o^* = 1.82$ cm. A positive pressure of $+100$ bars is then applied and the total mechanical work, $W_m^*$, done on the bubble is $2.59 \times 10^2$ joules.

The bubble collapses to a minimum radius of $R_m^* = 1.92 \times 10^{-6}$ cm. and then remains relatively motionless for 10 picoseconds. In that time interval, the temperature remains at its maximum, $T_m^* = 1.64 \times 10^8$ K. and the pressure at its maximum, $p_m^* = 6.32 \times 10^{+13}$ bars. The number of (d,t) reactions that take place in the bubble in this time interval is $3.93 \times 10^{10}$. Each reaction releases $3.20 \times 10^{-12}$ joules and hence the total energy released is $1.26 \times 10^{-1}$ joule. The net energy gain is then only $4.86 \times 10^{-4}$.

However, each (t,d) reaction produces a neutron and a helium-4 nucleus and each fusion neutron on an average produces 1.5 tritium nuclei in the Li-blanket. Thus the collapse of the bubble produces $7.08 \times 10^{10}$ tritium nuclei or $1.18 \times 10^{-13}$ mols of tritium. The amount of tritium originally in the seed was $N_t = 3.05 \times 10^{-14}$ mols so that the net gain in tritium is 3.9.

When the calculation for a Type II CFR is repeated using deuterium alone as fuel, the yield of tritium is $1.63 \times 10^{-15}$ mols. Here again the necessary inventory of tritium can be built up using deuterium alone.

There are other very great advantages in using liquid metals as the host liquid in a CFR. Electromagnetic radiation from excited atoms in a collapsing bubble will be trapped within the bubble by the metallic interface and in a liquid metal all energy carried by charged particles will be quickly absorbed in the metal and appear as heat. The thermal conductivities of liquid metals are all large and hence liquid metals are highly efficient agents for transfer to heat out of the reactor. All liquid metals have large values of the coefficient of surface tension, a property that helps the bubble interface to retain its spherical shape during collapse.

In the foregoing disclosure, both the specification of a Type I CFR and discussion of the stability of the interface of a collapsing bubble have assumed that at its maximum radius a bubble is spherical in shape. The interface of a spherical bubble is stable during expansion, but is unstable during collapse, in the sense that a small perturbation of the interface may grow. Several methods have been described for inhibiting the growth of such instabilities through creation of a zero-gravity field within the cavitation zone of a CFR. Another method of operating a CFR so as to prevent destruction of a collapsing bubble's interface from growth of surface instabilities will now be described in the context of a Type I CFR; but it is to be understood that it will apply equally as well as to a Type II CFR.

The interface of a cylindrical (or quasi-cylindrical) bubble has neutral stability in the sense that any small perturbation of the surface will neither grow nor decay. In arrangements to be described, bubbles are constrained to assume a quasi-cylindrical shape and hence have neutral stability against the growth of a surface perturbation. Points at which a vertical axis through the center of a bubble intersects the interface will be called the "poles" of the bubble, and the intersection of the bubble interface with a horizontal plane will be called the "equatorial circumference."

Alternative arrangements for creating quasi-cylindrical bubbles in a CFR include:

1. Rotation of the host liquid in a cavitation zone around a vertical axis. The rotation of the liquid metal may be induced by "motor" action of an imposed, time-varing magnetic field. A bubble on the axis of rotation will assume a quasi-cylindrical shape because the rotation generates an inward force in the liquid at the interface that is a maximum at the equatorial circumference and a minimum at the poles. 2. Superposition of static, horizontal, uniform magnetic fields on the cavitation zone. Such magnetic fields generate a distribution of forces that has the same net effect as that created by rotation of the host liquid. The directions of the magnetic fields are distributed symmetrically about a vertical axis through the cavitation zone. Each magnetic field interacts with a collapsing bubble so as to induce eddy currents in the liquid metal at the interface. These currents in turn interact with the magnetic field so as to oppose the inward motion. When a number of such equally spaced magnetic fields of equal magnitude are superposed, the net "drag" force opposing the inward motion will be a maximum at the poles and a minimum at the equatorial circumference. The difference between the maximum and the minimum forces increases with the number of superposed fields. Hence the collapsing bubble will move inwardly more rapidly at the equatorial circumference and will assume a quasi-cylindrical shape. 3. Superposition of high-frequency acoustic pressure fields on the cavitation zone. The desired result may be brought about by standing wave fields, pulses or a combination of the two. In the arrangement to be described, the radiation pressure of high-frequency, high-intensity pulse trains is employed in order to achieve the necessary field geometry. When a plane wave is incident on a completely reflecting surface, such as a bubble interface, a force called the radiation pressure is exerted on the bubble interface. Intersecting beams of high-frequency (of the order of 1 MHz, for example) pulse trains are generated by transducers arranged symmetrically on the vertical wall of the reaction chamber around the cavitation zone so as to approximate a uniform inward force on the bubble. After a low-frequency pressure field in its negative phase expands a seed to a maximum radius $R_o$, pulse trains are simultaneously emitted by the circular array of transducers. The vertical and horizontal widths of any one beam are of the order of magnitude of the diameter of the cavitation zone. The bubbles will then be subjected to a radiation pressure that is a maximum on the equatorial circumferences and a minimum at the poles of the bubbles. Under this force geometry the contracting bubble will become a quasi-cylinder. At the same time, the low frequency field will exert a uniform positive pressure on the bubble.

Having thus described my invention what I claim is:

1. A method of producing nuclear fusion, neutrons and tritium by cavitation of a liquid metal containing hydrogen isotopes, comprising placing a liquid metal containing hydrogen capable of nuclear fusion isotopes in a chamber, applying an external force in opposition to the force of gravity on the liquid metal thereby to counterbalance the force of gravity on the liquid metal so as to yield an effective gravity force of approximately zero on the liquid metal and form a cavitation zone therein, and applying an acoustical pulsing field having alternating negative and positive pressure pulses to the liquid metal to vary its ambient pressure sufficiently to induce in the metal in said zone a cavitation effect which causes at least one small bubble in the liquid to expand by means of a negative pressure pulse and then to collapse violently by means of a positive pressure pulse, thereby effecting nuclear fusion of said hydrogen isotopes.

2. A method as defined in claim 1 wherein the force of gravity is counterbalanced in said cavitation zone by creating a vertical standing pressure wave in said liquid metal, the amplitude and phase of said standing wave being such that said standing wave reduces the force of gravity on said bubble during the expansion phase thereof in said cavitation zone.

3. A method as defined in claim 1 wherein the force of gravity is counterbalanced in said cavitation zone by means of an acceleration applied to said chamber, whereby applied acceleration reduces the force of gravity during the expansion phase of said bubble in said cavitation zone.

4. A method as defined in claim 1 wherein the force of gravity is counterbalanced in said cavitation zone by means of a horizontally directed magnetic field which is inhomogeneous in the vertical direction, and approximately homogeneous in the horizontal direction.

5. A method as defined in claim 1, including supplying deuterium to said liquid metal to replenish the hydrogen isotopes exhausted by said fusion.

6. A method as defined in claim 5, wherein said liquid metal approximately fills said chamber, and said deuterium is fed to a space located in said chamber above the level of the liquid metal therein.

7. A method as defined in claim 5, wherein said deuterium is mixed with tritium and fed directly into said liquid metal to form bubbles therein.

8. A method as defined in claim 1, wherein the temperature of said liquid metal is maintained in the range of approximately 1000 K. to 1500 K.

9. A method as defined in claim 1, wherein said liquid metal is selected from the group consisting of lithium, beryllium, aluminum, tin, thallium and indium, and isotopes and alloys thereof.

10. A method as defined in claim 1 wherein said liquid metal is selected from the group consisting of normal lithium, lithium-6, lithium 7, beryllium, and alloys thereof.

11. A method as defined in claim 1, wherein said liquid metal is selected from the group consisting of tin, thallium, indium and aluminum.

12. A method as defined in claim 1, wherein the variation of said ambient pressure comprises cyclically decreasing and then increasing the pressure in said chamber alternately below and above, respectively, the value of said ambient pressure.

13. A method as defined in claim 12, wherein the cycle of applied acoustical pressure comprises a sequence of a negative pressure of 50-100 bars followed by a positive pressure of 100-200 bars.

14. A method as defined in claim 1 wherein the variation of said ambient pressure comprises intermittently lowering the pressure in said chamber to a value below said ambient pressure.

15. A method as defined in claim 1, including using acoustical horns for applying said acoustic pressure to said liquid metal, and also for conducting heat from the fusion reaction in said chamber to a heat transfer means positioned externally of said chamber.

16. A cavitation fusion reactor for producing nuclear fusion neutrons and tritum, comprising a first housing therein a chamber for holding a liquid metal at elevated temperatures and pressures, a neutron and tritium shield surrounding said housing in spaced relation thereto, an inert gas located in said space and surrounding said housing, means for applying an external force in opposition to the force of gravity on the liquid metal thereby to counterbalance the force of gravity on the liquid metal so as to yield an effective gravity force of approximately zero on the liquid metal and form a cavitation zone therein, and means for applying an acoustical pulsing field having alternating negative and positive pressure pulses to the liquid metal to vary its ambient pressure sufficiently to induce in the metal in said zone a cavitation effect which causes at least one small bubble to be formed and expand by means of said negative pressure pulse and then to collapse violently by means of a positive pressure pulse, said means for applying acoustic pulses including a first plurality of acoustical horns mounted intermediate their ends in said housing and said shield, respectively, and extending through said space to supply acoustical energy to a liquid metal in said chamber, and means for supplying deuterium to said chamber, thereby to provide hydrogen isotopes that are subjected to nuclear fusion by said acoustical energy.

17. A cavitation fusion reactor as defined in claim 16, wherein said horns are metallic and function to conduct heat from the fusion reaction in said chamber, and heat transfer means is connected to each of said horns at the ends thereof located exteriorly of said chamber, thereby to absorb the heat conducted by said horns from the chamber.

18. A cavitation fusion reactor as defined in claim 16, wherein a second housing surrounds said first housing in spaced relation both to said first housing and to said shield, and said first housing is lined with beryllium and is immersed in a liquid alloy of lithium and beryllium which approximately fills said second housing.

19. A cavitation fusion reactor as defined in claim 18 wherein the space between said second housing and said shield is filled with said inert gas.

20. A cavitation fusion reactor as defined in claim 18 including a second plurality of acoustical horns mounted on said second housing for supplying acoustical energy to the liquid alloy in said second housing.

21. A cavitation fusion reactor as defined in claim 18, including means for withdrawing tritium and deuterium from above the upper surfaces of the liquid metals in said first and second housings and for recirculating mixtures of said tritium and deuterium to the liquid metal in said first housing.

* * * * *